(12) United States Patent
van Velsen (10) Patent No.: US 8,903,436 B2
(45) Date of Patent: Dec. 2, 2014

(54) METHODS, SYSTEMS, AND COMPUTER READABLE MEDIA FOR SHORT MESSAGE SERVICE/MULTIMEDIA MESSAGE SERVICE POLICY CONTROL

(75) Inventor: Arnoud Fransciscus Antonius van Velsen, Hoofddorp (NL)

(73) Assignee: Tekelec, Inc., Morrisville, NC (US)

( * ) Notice: Subject to any disclaimer, the term of this patent is extended or adjusted under 35 U.S.C. 154(b) by 8 days.

(21) Appl. No.: 13/333,452

(22) Filed: Dec. 21, 2011

(65) Prior Publication Data

US 2012/0184307 A1 Jul. 19, 2012

Related U.S. Application Data

(60) Provisional application No. 61/425,625, filed on Dec. 21, 2010.

(51) Int. Cl.
*H04W 4/14* (2009.01)
*H04M 15/00* (2006.01)
*H04W 4/12* (2009.01)

(52) U.S. Cl.
CPC ............. *H04W 4/12* (2013.01); *H04M 15/66* (2013.01); *H04M 2215/28* (2013.01)
USPC .......................................... 455/466; 370/236

(58) Field of Classification Search
USPC .................. 455/466; 370/252, 329; 726/1
See application file for complete search history.

(56) References Cited

U.S. PATENT DOCUMENTS

| 2010/0098231 | A1* | 4/2010 | Wohlert ................. 379/207.15 |
| 2010/0154031 | A1* | 6/2010 | Montemurro et al. ............ 726/1 |
| 2011/0188457 | A1* | 8/2011 | Shu et al. ...................... 370/329 |
| 2012/0039175 | A1* | 2/2012 | Sridhar et al. ................ 370/236 |
| 2013/0016624 | A1* | 1/2013 | Li et al. ......................... 370/252 |

OTHER PUBLICATIONS

"3rd Generation Partnership Project; Technical Specification Group Core Network and Terminals; Policy and Charging Control (PCC) over Gx/Sd reference point (Release 11)," 3GPP TS 29.212, V11.2.0, pp. 1-164. (Sep. 2011)

"3rd Generation Partnership Project; Technical Specification Group Core Network and Terminals; Policy and Charging Control (PCC) over S9 reference point; Stage 3 (Release 9)," 3GPP TS 29.215, V9.2.0, pp. 1-36 (Mar. 2010).

* cited by examiner

*Primary Examiner* — Myron K Wyche
(74) *Attorney, Agent, or Firm* — Jenkins, Wilson, Taylor & Hunt, P.A.

(57) ABSTRACT

Methods, systems, and computer readable media for SMS or MMS policy control are disclosed. According to one aspect, a method for controlling short message service SMS or MMS resources in a telecommunications network includes, at a policy node, generating a message that includes an SMS or MMS policy rule and communicating the message to a network element that performs SMS or MMS routing or processing, and, at the network element, enforcing the SMS or MMS policy rule. In one embodiment, the SMS or MMS policy rule applies to SMS or MMS messages that are associated with a particular subscriber, a particular class of subscribers, and/or a particular network provider or set of network providers.

34 Claims, 4 Drawing Sheets

METHODS, SYSTEMS, AND COMPUTER READABLE MEDIA FOR SHORT MESSAGE SERVICE/MULTIMEDIA MESSAGE SERVICE POLICY CONTROL

PRIORITY CLAIM

This application claims the benefit of U.S. Provisional Patent Application Ser. No. 61/425,625, filed Dec. 21, 2010; the disclosure of which is incorporated herein by reference in its entirety.

TECHNICAL FIELD

The subject matter described herein relates to methods and systems for managing SMS and/or MMS traffic in a telecommunications network. More particularly, the subject matter described herein relates to methods, systems, and computer readable media for SMS/MMS policy control.

BACKGROUND

SMS text messaging is very popular service worldwide. Telecommunications network providers have seen an enormous increase in SMS traffic, and there is no indication that the amount of SMS traffic will do anything but continue to increase at the same or greater rate. SMS subscribers desire the ability to send unlimited text messages, and network providers have often either provided unlimited text messaging as a premium feature for which subscribers must pay extra, or offered unlimited text messaging as a standard feature to entice new customers. However, unlimited SMS or MMS messaging raises a number of potential problems with which network providers must deal.

One problem is that a network provider's subscribers may receive unwanted SMS text messages, also referred to as "spam" messages, from a foreign network, i.e., from a network other than the receiver's network provider. Where the sender of the unwanted messages is a subscriber of a foreign network, the sender is not under control of the network that receives them, and therefore cannot be charged extra for the volume of spam traffic or have their subscriber accounts revoked, etc. For this reason network providers may desire a mechanism by which the volume of foreign-originated SMS, and particularly foreign-originated mobile-terminated (MT) SMS may be controlled.

Another problem is that for networks that charge the subscriber for each received text message, a subscriber that receives a large number of SMS messages may incur a large bill through no action of their own but because of the actions of others, i.e., the senders of the many SMS messages that the subscriber received. The dismay or outrage felt by the subscriber at having to pay an unexpectedly large bill is sometimes referred to as "bill-shock". A subscriber may be even more aggravated when the subscriber is charged for receiving messages that they never wanted in the first place, such as spam SMS message. To prevent the subscriber from feeling that they were punished for the actions of others, network providers may desire a mechanism to limit the number of MT SMS messages that a subscriber can receive during a particular period, either on a per-subscriber basis or a per-class-of-subscriber basis. Such a mechanism could protect a subscriber from having to pay for unwanted SMS messages that came from a foreign network or from the subscriber's own network as well.

Yet another problem for networks that provide "unlimited" mobile-originated (MO) SMS messages is that the network provider must make some assumptions about what would be the maximum number of SMS messages that could be sent by a real subscriber, and deploy a sufficient amount of network hardware to support the estimated amount of traffic produced by all of the subscribers. While an actual subscriber might send only tens, hundreds, or even thousands of text messages in a month, computerized systems that generate spam SMS messages could send tens of thousands or hundreds of thousands of SMS messages during the same period. When this happens, the network may not have the capacity to support the huge volume of SMS messages that are generated by bulk spamming operations. For this reason, network providers may desire a mechanism by which the volume of MO SMS messages may be controlled, particularly on a per-subscriber basis. A related problem is that there may be times when a large number of subscribers may attempt to send a large number of text messages, such as during religious holidays or during a local or national emergency. In such situations a network provider may desire a mechanism by which the number of MO SMS messages that can be sent by each of certain subscribers, certain classes of subscribers, or even all subscribers may be limited.

Subscribers also may desire the ability to limit or control SMS messages. For example, a subscriber may want to block SMS messages that are sent from specific numbers, commonly referred to as "blacklisting", or a subscriber may want to allow SMS messages only from specific numbers, commonly referred to as "whitelisting." Parents may desire to set limits on the number of SMS messages that a child may send or receive. For this reason, network subscribers may desire a mechanism by which incoming and outgoing SMS messages may be controlled. Likewise, a network provider may desire to offer such a mechanism to its subscribers.

All of the above-mentioned problems with SMS messaging also apply to MMS messaging as well.

Accordingly, there exists a need for mechanisms by which network providers or network subscribers may limit or control the volume of certain types of SMS or MMS traffic, including local/foreign-originated MT SMS or MMS messages, MO SMS or MMS messages from certain users, and/or MT SMS or MMS messages to certain users. More specifically, there exists a need for methods, systems, and computer readable media for SMS or MMS policy control.

SUMMARY

According to one aspect, the subject matter described herein includes a system for SMS or MMS policy control. The system includes a policy node for generating a message that includes an SMS or MMS policy rule instruction and a network element that intercepts SMS or MMS messages, wherein the network element receives the message from policy node and implements the SMS or MMS policy rule instruction. In one embodiment, implementing the policy rule instruction may include installing, modifying, removing, activating, or deactivating a policy rule. In one embodiment, the policy rule applies to SMS or MMS messages that are associated with a particular subscriber, a particular class of subscribers, and/or a particular network provider or set of network providers.

According to another aspect, the subject matter described herein includes a method for SMS or MMS policy control. According to one aspect, a method for controlling short message service SMS or MMS resources in a telecommunications network includes, at a policy node, generating a message that includes an SMS or MMS policy rule instruction and communicating the message to a network element that intercepts SMS or MMS messages, and, at the network element, implementing the SMS or MMS policy rule instruction. In one embodiment, implementing the policy rule instruction may include installing, modifying, removing, activating, or deactivating a policy rule. In one embodiment, the SMS or MMS policy rule applies to SMS or MMS messages that are associated with a particular subscriber, a particular class of subscribers, and/or a particular network provider or set of network providers.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, methods, systems, and computer readable media are provided for SMS or MMS policy control.

Reference will now be made in detail to exemplary embodiments of the present invention, examples of which are illustrated in the accompanying drawings. Wherever possible, the same reference numbers will be used throughout the drawings to refer to the same or like parts.

Figure 1:
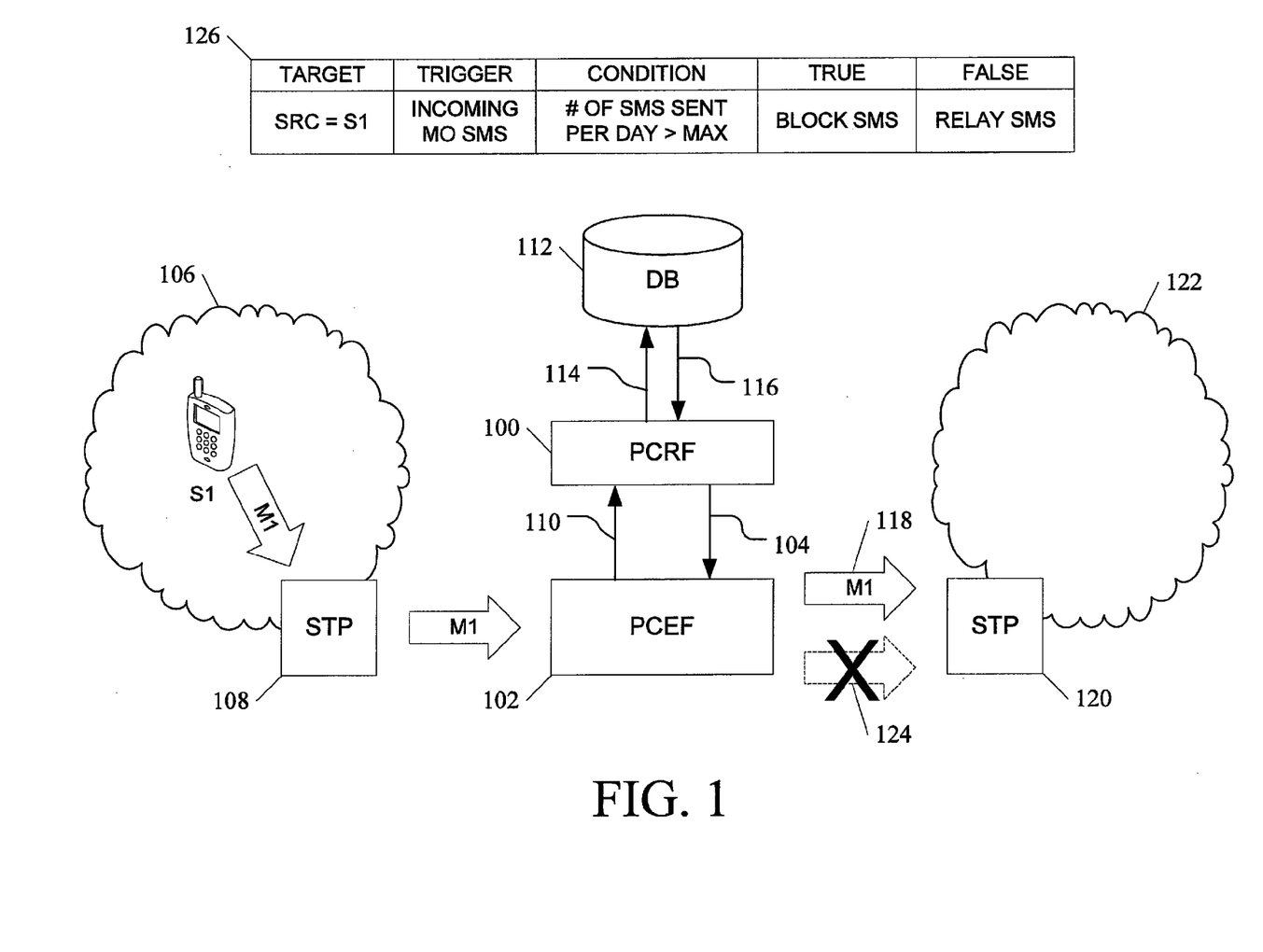
FIG. 1 is a block diagram illustrating an exemplary system for SMS or MMS policy control according to an embodiment of the subject matter described herein.

FIG. 1 is a block diagram illustrating an exemplary system for SMS or MMS policy control according to an embodiment of the subject matter described herein. In the embodiment illustrated in FIG. 1, the system includes a policy node 100 for generating messages that include an SMS or MMS policy rule instruction, and a network element 102 that intercepts SMS or MMS messages. Network element 102 receives a message containing an SMS or MMS policy rule instruction 104 from policy node 100 and implements the SMS or MMS policy rule instruction. Implementing the policy rule instruction may include installing, modifying, removing, activating, or deactivating a policy rule. For example, a policy rule instruction may be to activate or deactivate a policy rule that is predefined within network element 102. A policy rule instruction may include a policy rule for network element 102 to install. A policy rule instruction may identify a policy rule that was formerly installed within network element 102 along with instructions to modify or remove the identified policy rule.

In the embodiment illustrated in FIG. 1, policy node 100 is a policy and charging rules function (PCRF) node, but other types of policy nodes may be used. Likewise, in the embodiment illustrated in FIG. 1, network element 102 is a policy and charging enforcement function (PCEF) node, but other types of network elements that intercept, route, and/or process SMS messages may be used. For example, network element 102 may be, include, or be a component of an SMS router, a short message service center (SMSC), an SMS or MMS groomer, a session initiation protocol (SIP) message server, a multimedia message server, a signal transfer point (STP) in a signaling system 7 (SS7) network, a first delivery attempt node, an SMS or MMS gateway, or other node that intercepts, routes and/or processes SMS or MMS messages. In one embodiment, message 104 is a DIAMETER protocol message, but other suitable message protocols may also be used. Message 104 may be communicated from policy node 100 to network element 102 via various types of interfaces, including but not limited to a Gx interface.

FIG. 1 illustrates in detail one example of how the system would operate. In the embodiment illustrated in FIG. 1, a mobile subscriber S1 in the mobile subscriber's home network 106 wants to send an SMS or MMS message, M1, to a friend. Message M1 is received by a message routing node, such as STP 108, which forwards the message to network element 102. In response to intercepting message M1, which in this example is an incoming mobile-originated (MO) SMS message, network element 102 may issue a policy request 110.

For example, network element 102 may have determined that message M1 was sent from a subscriber for which network element 102 does not yet have any particular policy instruction. Network element 102 may request policy instructions based on other triggering conditions as well, such as the receipt of an SMS or MMS message from a class of subscribers or from a particular network, such as from a foreign network.

In the embodiment illustrated in FIG. 1, policy node 100 receives policy request 110 from network element 102, but a policy request could come from other network nodes or entities as well. In response to receiving policy request 110, policy node 100 generates message 104, which includes an SMS or MMS policy rule instruction, and sends message 104 to network element 102.

In one embodiment, policy node 100 may store policy rules or policy rule instructions in a database 112 or other suitable data storage means. In the embodiment illustrated in FIG. 1, for example, policy node 100 may send a query 114 to database 112 and receive a response 116 that includes either the policy rule itself or information that policy node 100 may then use to create the policy rule instruction (which may itself contain a policy rule) that is sent in message 104. In one embodiment, database 112 may be co-located with or a component of policy node 100. In an alternative embodiment, database 112 may be remote from policy node 100, in which case query 202 and response 204 may be SS7 TCAP protocol messages, HTTP protocol messages, messages that use a protocol suitable for querying a database and receiving a result, or any other suitable protocol. In one embodiment, policy node 100 may access SMS or MMS subscriber service profile information from a subscriber data repository, such as from a home location register (HLR), a home subscriber server (HSS), or a subscriber profile repository (SPR). In one embodiment, database 112 or some other data store may be used to maintain statistics or other information needed by the policy rule or needed to determine whether a triggering condition is true, such as the current number of SMS messages sent or received by a subscriber, the number of SMS messages received from a foreign network, and the like. In one embodiment, policy node 100 may be configured to generate message 104 without requiring access to database 112.

According to the policy rule instruction, network element 102 may take appropriate action, which may include applying a policy rule to the recently received message M1. For example, network element 102 may forward message M1 towards its destination, such as to another STP 120. This action is shown in FIG. 1 as arrow 118. STP 120 may be in the same network as the message sender, or, as shown in the embodiment illustrated in FIG. 1, in a different network 122 from the subscriber's home network 106. Alternatively, the policy rule may instruct network element 102 to block or discard message M1 instead of forwarding it. This action is shown in FIG. 1 as a blocked dashed arrow 124. The policy rule may instruct network element 102 to take other actions, to take a combination of actions, or to take no action.

FIG. 1 includes an example of information 126 that may be part of a policy rule instruction and/or that represents an action or actions that may be taken as a result of application of a policy rule that limits the amount of SMS or MMS traffic that a subscriber or class of subscriber is allowed to send during a particular period. A policy rule may have a target set of messages to which the rule will apply, such as messages to or from a particular subscriber. In the embodiment illustrated in FIG. 1, a policy rule targets SMS messages that are sent from a particular source, subscriber S1. The rule may have one or more trigger conditions, which are conditions that cause the rule to be applied or at least considered for application. In FIG. 1, for example, a policy rule may be triggered when network element 102 intercepts an MO SMS message that was sent from subscriber S1. In one embodiment, a rule may have a test condition, and may have either a set of actions that are to be performed if the condition is true, a set of actions that are to be performed if the condition is false, or both. In the embodiment illustrated in FIG. 1, for example, the test condition is to determine whether the number of SMS messages that have been sent by subscriber S1 has exceeded a maximum number (MAX) allowed for that subscriber per day: if so, the incoming SMS message will be blocked or discarded; otherwise, the SMS message will be forwarded, routed, or otherwise relayed to its destination.

SMS or MMS policy rules that are intended to prevent abuse of unlimited SMS or MMS subscriptions, for example, are sometimes referred to as "fair use" policy rules. A network provider may desire to apply particular fair use policies in certain circumstances, such as fair use as part of an unlimited SMS package bundle. Examples of fair use policy rules that a network provider may apply to an unlimited SMS subscriber include limiting the number of SMS messages sent and/or received per day, per week, or per month. Network providers may attempt to prevent automated or machine-generated SMS messages by limiting the rate at which SMS messages may be sent. A network provider may apply policy rules to limit the number or rate of SMS messages sent during certain times of day or during certain days of the week.

A network provider may desire to apply fair use promotions or additional fair use restrictions during specific events, such as religious or national holidays. For example, during Ramadan or Christmas, when the number of subscribers sending SMS messages soars, policy rules may operate to temporarily limit the number of SMS messages that even an unlimited SMS plan subscriber may send per day, so that all subscribers have a chance to send at least some amount of SMS messages in the highly congested network. A network provider may apply policy rules that implement additional restrictions in particular circumstances, such as in the event of a natural disaster or national emergency, in which case SMS messages from law enforcement or emergency personnel may be given priority over other SMS subscribers. Instead of blocking or otherwise limiting excessive SMS messages, a network provider may apply policy rules that impose a surcharge for SMS messages over a predefined maximum number or rate.

The policy rules described above (and other policy rules not described above) may be implemented by the system illustrated in FIG. 1. In one embodiment, database 112 may include policy rules that are active during certain dates, times, or days of the week, policy rules that become active when the system detects that SMS traffic in general has increased to a level above a threshold limit, or policy rules that become active upon a specific command from the network operator, such as during a national emergency. The policy rules described above could also apply to MMS messages.

Figure 2:
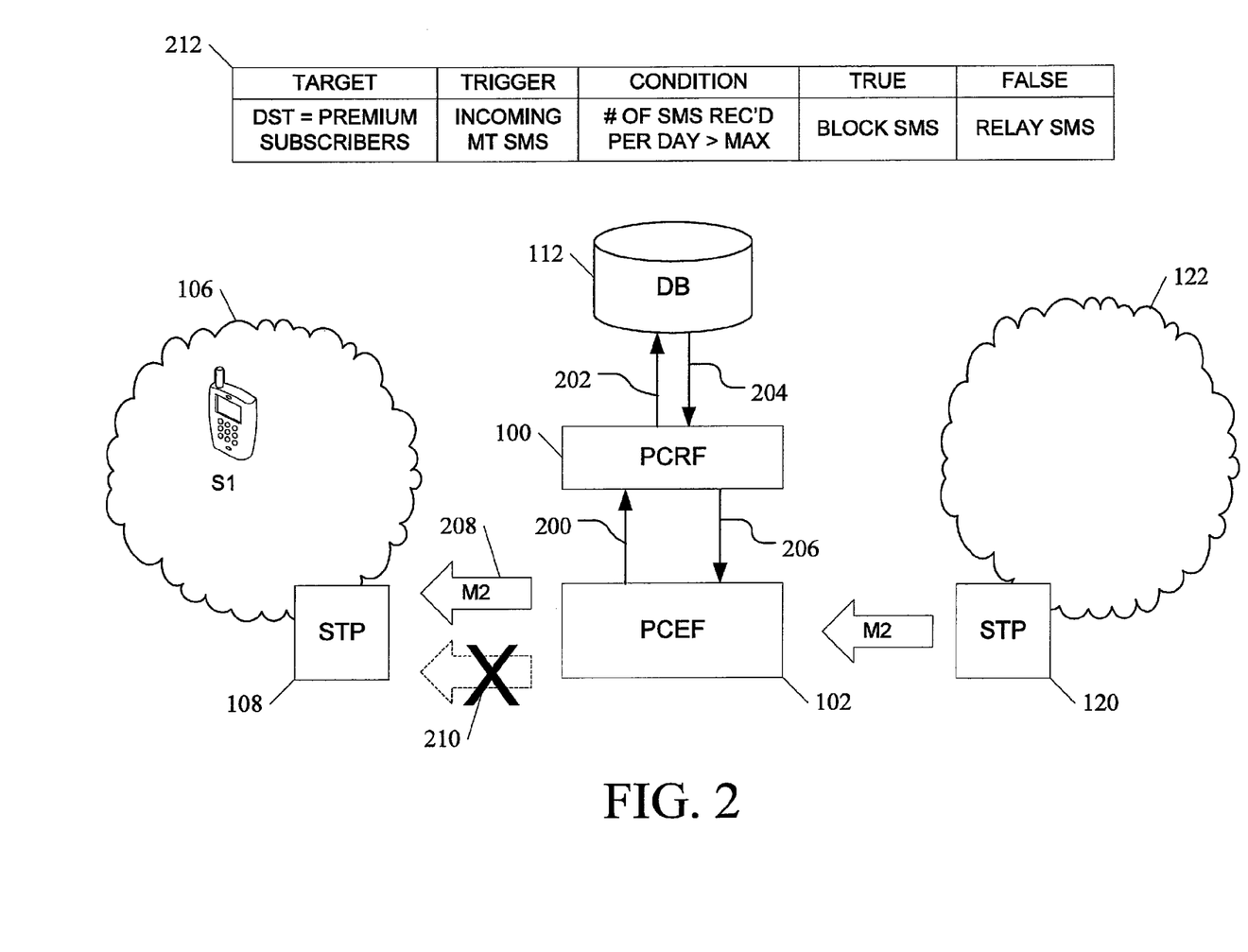
FIG. 2 is a block diagram illustrating in detail the operation of an exemplary system for SMS or MMS policy control according to another embodiment of the subject matter described herein.

FIG. 2 is a block diagram illustrating in detail the operation of an exemplary system for SMS or MMS policy control according to another embodiment of the subject matter described herein. In the embodiment illustrated in FIG. 2, subscriber S1 is the intended recipient of a mobile terminated SMS or MMS message M2, which is received by network element 102 in transit. In response to receiving message M2, network element 102 sends a policy request 200 to policy node 100.

In the embodiment illustrated in FIG. 2, policy node 100 sends a query 202 to and receives a response 204 from policy rules database 112. In one embodiment response 204 contains a policy rule, which policy node 100 forwards to network element 102. Alternatively, response 204 may include information from which policy node 100 can derive or generate a policy rule. In either case, policy node 100 sends a message containing a policy rule instruction 206 to network element 102.

In response to receiving information from policy node 100, network element 102 implements the policy rule instruction that was contained within message 206. FIG. 2 includes an example of information 208 that may be part of a policy rule instruction and/or that represents an action or actions that may be taken as a result of application of a policy rule for limiting the amount of mobile terminated SMS or MMS traffic that a subscriber receives. In the embodiment illustrated in FIG. 2, for example, the rule is triggered by an incoming MT SMS message directed to a class of subscribers, such as premium subscribers, of which subscriber S1 is a member. If the specified condition is not met, e.g., that the number of SMS messages received by the subscriber has not exceeded a maximum number of messages that may be received per day, then the incoming MT SMS message M2 will be relayed to its intended destination, subscriber S1 (shown as arrow 210). Otherwise, the incoming MT SMS message M2 will be blocked or discarded (shown as blocked arrow 212.) In this example, the rule is applied to all subscribers of the same class, but the condition checking uses the particular subscriber's information, such as that subscriber's current total of SMS messages received for the current period.

Figure 3:
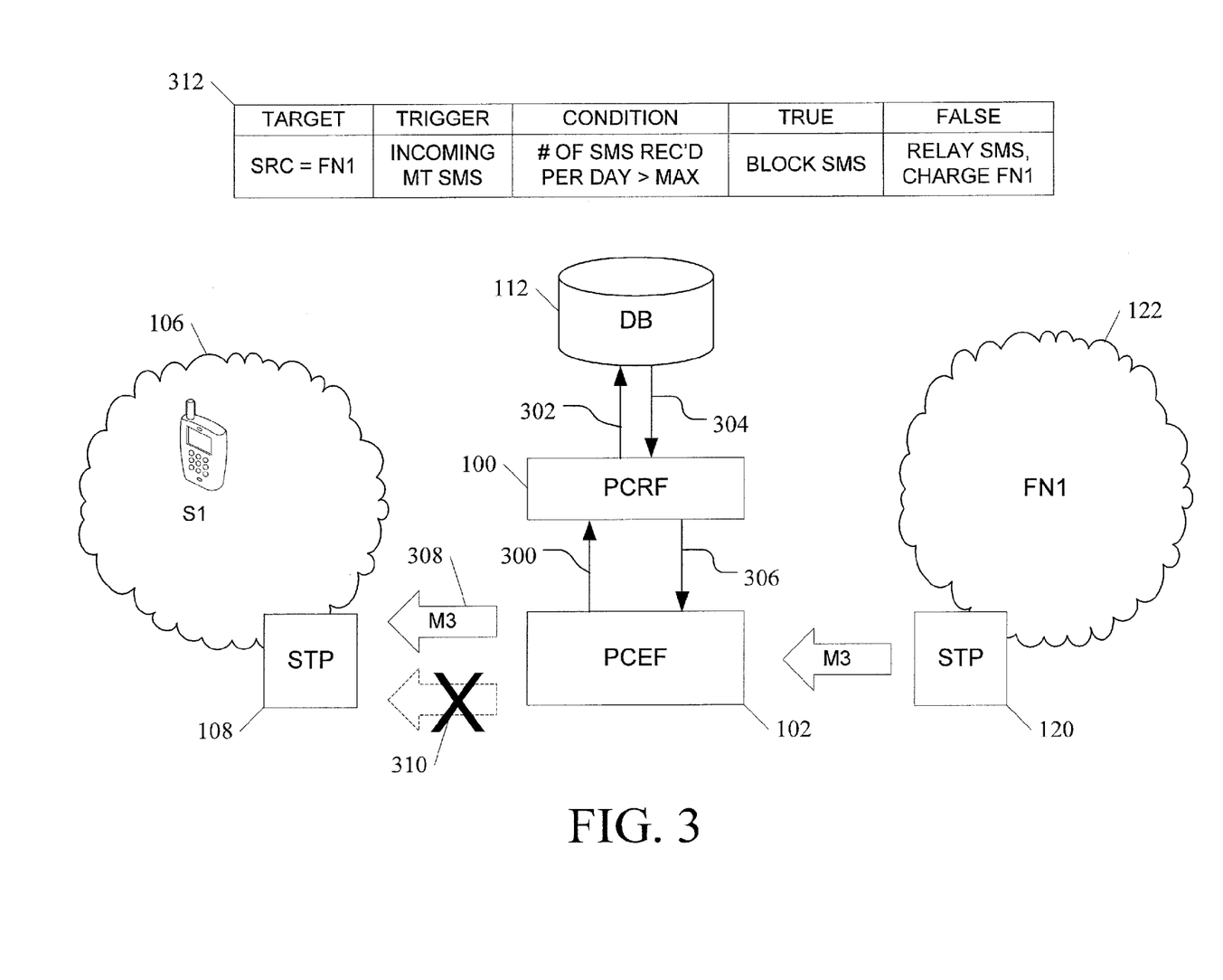
FIG. 3 is a block diagram illustrating in detail the operation of an exemplary system for SMS or MMS policy control according to yet another embodiment of the subject matter described herein.

FIG. 3 is a block diagram illustrating in detail the operation of an exemplary system for SMS or MMS policy control according to yet another embodiment of the subject matter described herein. In the embodiment illustrated in FIG. 3, subscriber S1 is the intended recipient of a mobile terminated SMS or MMS message M3, which was sent by something or someone in foreign network FN1 and received by network element 102 in transit. In response to receiving message M3, network element 102 may send a policy request 300 to policy node 100. In the embodiment illustrated in FIG. 3, policy node 100 sends a query 302 to database 112 and receives a response 304 from database 112. Policy node 100 then sends a message 306 containing a policy rule instruction to network element 102.

FIG. 3 includes an example of information 308 that may be part of a policy rule instruction and/or that represents an action or actions that may be taken as a result of application of a policy rule for limiting the amount of mobile terminated SMS or MMS traffic that is received from a particular network. In the embodiment illustrated in FIG. 3, for example, the rule is triggered by receipt of an incoming MT SMS message from foreign network FN1. If the number of SMS or MMS messages received by FN1 exceeds a quota, limit, or threshold number, the SMS or MMS message from FN1 may be blocked or discarded. Otherwise, if the specified condition is not met, e.g., that the number of SMS messages received by the subscriber has not exceeded a maximum number of messages that may be received per day, then the incoming MT SMS message M3 will be allowed into network 106 (shown as arrow 310).

In one embodiment, the policy rule may specify other consequences. In the embodiment illustrated in FIG. 3, for example, whenever an SMS or MMS message from foreign network FN1 is allowed into local network 106, foreign network FN1 may be charged a fee, such as an access fee, for the privilege. Otherwise, the message M3 will be prohibited from entering network 106 (shown as blocked arrow 312.) Additional actions that may be performed as a result of a policy rule include, but are not limited to, redirecting an incoming SMS or MMS message to another destination, e.g., to law enforcement, sending a copy of the SMS or MMS message to another destination, e.g., to a logging server, or generating a new message, e.g., a notification message. For example, network element 102 may issue warning messages to alert a sender that the receiver has exceeded a limit and can no longer accept messages for the remainder of the period, to alert a sender that the sender has exceeded a limit and can no longer send messages for the remainder of the period, to alert the network operator for a foreign network that SMS traffic from the foreign network has been suspended due to unacceptably high traffic coming into the local network from the foreign network, to alert a parent that a child is sending text messages instead of sleeping, or that a child is receiving text messages from an unwanted number, and so on.

In one embodiment, multiple policy rules may be combined. For example, information 208 shown in FIG. 2 and information 308 shown in FIG. 3 may represent a pair of policy rule instructions that are both applied if the target and trigger conditions are met. In this example, network element 102 may receive or intercept a message that is sent from FN1 and sent to subscriber S1. In one scenario, the number of messages sent from FN1 has not exceeded a limit, in which case a policy rule based on information 308 does not apply, but number of message received by S1 has exceeded a limit, in which case a policy rule based on information 208 does apply to block that message. Likewise, the policy rule instruction (and the policy rule that it represents) may range from very simple to very complex, with multiple targets, triggers, and/or conditions.

In one embodiment, a policy rule may apply to messages that associated with a particular subscriber, a class of subscribers, and/or a network provider. In one embodiment, a policy rule may consider time of day, day of the week, or other conditions independent of the source or destination of the SMS or MMS message. Separate quotas or limits may be independently imposed based on whether the messages is SMS or MMS, MO or MT, and so on. A policy rule may limit messages based on message count, message size, message data volume, rate of message generation, and/or rate of message receipt. A policy rule may be based on an identity of a sender or receiver of the SMS or MMS message. For example, a policy rule may allow or block SMS messages based on whether sender or receiver is on a whitelist or blacklist. In one embodiment, the whitelist or blacklist may be maintained by the network provider, the subscriber, or a combination of the two. In one embodiment, a policy rule may be based on the identity of the source network or the destination network of an SMS or MMS message.

Figure 4:
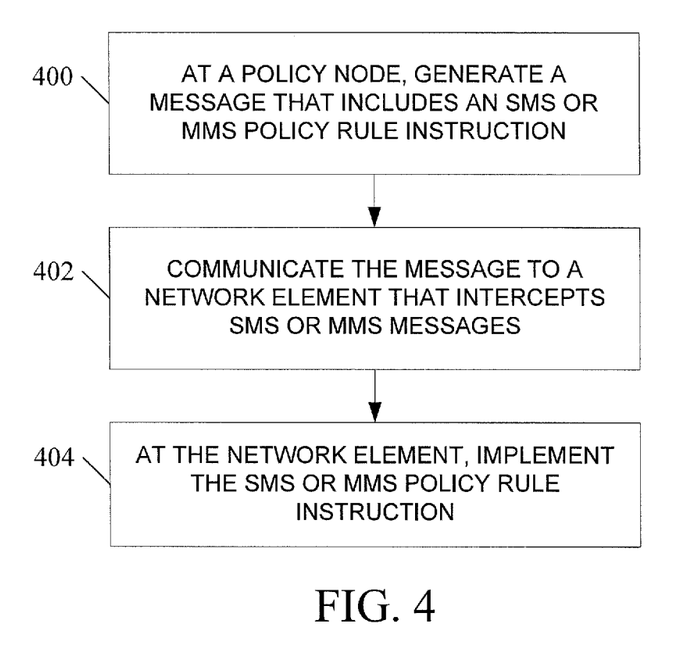
FIG. 4 is a flow chart illustrating an exemplary process for SMS or MMS policy control according to another embodiment of the subject matter described herein.

FIG. 4 is a flow chart illustrating an exemplary process for SMS or MMS policy control according to another embodiment of the subject matter described herein. In the embodiment illustrated in FIG. 4, at block 400, a policy node generates a message that includes an SMS or MMS policy rule instruction. At block 402, the message is communicated to a network element that intercepts SMS or MMS messages, and at block 404, the network element implements the SMS or MMS policy rule instruction. For example, in FIG. 1, policy node 100 sends a message 104 to network element 102, which may ultimately cause a policy rule to be applied or cease to be applied. Application of a policy rule may result in an incoming SMS or MMS message M1 either being allowed (118) or blocked (120.)

It will be understood that various details of the subject matter described herein may be changed without departing from the scope of the subject matter described herein. Furthermore, the foregoing description is for the purpose of illustration only, and not for the purpose of limitation.

What is claimed is:

1. A method for short message service (SMS) or multimedia message service (MMS) policy control, the method comprising:

at a policy node, generating a message that includes a policy rule instruction pertaining to regulation of SMS or MMS traffic;

communicating the message to a network element that intercepts SMS or MMS messages; and at the network element, implementing the SMS or MMS policy rule instruction, wherein the policy rule instruction includes at least one of: an SMS or MMS message quota or limit; an SMS or MMS message generation rate limit; and an SMS or MMS message receipt rate limit.

2. The method of claim 1 wherein the policy node comprises a policy and charging rules function (PCRF).

3. The method of claim 1 wherein generating the message includes generating a message for communication via a Gx interface.

4. The method of claim 1 wherein generating the message includes generating a Diameter protocol message.

5. The method of claim 1 wherein generating the message includes generating the message in response to receipt, by the policy node, of a policy request.

6. The method of claim 5 wherein the policy request originates from the network element.

7. The method of claim 1 wherein communicating the message includes communicating the message via a Gx interface.

8. The method of claim 1 wherein implementing the SMS or MMS policy rule instruction comprises causing a policy rule to be at least one of: installed, modified, removed, activated, or deactivated.

9. The method of claim 8 wherein the policy rule applies to SMS or MMS messages that are associated with at least one of:
   a subscriber;
   a class of subscribers; and
   a network provider.

10. The method of claim 1 wherein the SMS or MMS message quota or limit includes at least one of:
   a mobile originated (MO) SMS or MMS message quota or limit; and
   a mobile terminated (MT) SMS or MMS message quota or limit.

11. The method of claim 10 wherein the SMS or MMS message quota or limit includes at least one of:
   an SMS or MMS message count quota or limit;
   an SMS or MMS message size quota or limit; and
   an SMS or MMS message data volume quota or limit.

12. The method of claim 1 wherein the network element comprises:
   a policy and charging enforcement function (PCEF) node;
   an SMS or MMS router;
   an SMS or MMS groomer;
   an SMS or MMS service center;
   a session initiation protocol (SIP) message server;
   a multimedia message server;
   a signal transfer point;
   a first delivery attempt node; or
   an SMS or MMS gateway.

13. The method of claim 1 wherein the policy node accesses SMS or MMS subscriber service profile information from a subscriber data repository.

14. The method of claim 13 wherein the subscriber data repository comprises:
   a home location register;
   a home subscriber server; or
   a subscriber profile repository.

15. The method of claim 8 wherein, based on the SMS or MMS policy rule, the network element performs at least one of:
   relaying a received SMS or MMS message;
   forwarding a received SMS or MMS message;
   blocking a received SMS or MMS message;
   copying a received SMS or MMS message;
   redirecting a received SMS or MMS message; and
   generating a new SMS or MMS message.

16. The method of claim 8 wherein the SMS or MMS policy rule is based on at least one of:
   an identity of a sender of an SMS or MMS message;
   an identity of a receiver of an SMS or MMS message;
   an identity of a source network of an SMS or MMS message; and
   an identify of a destination network of an SMS or MMS message.

17. A system for short message service (SMS) or multimedia message service (MMS) policy control, the system comprising:

a policy node for generating a message that includes a policy rule instruction pertaining to regulation of SMS or MMS traffic; and
   a network element for that intercepts SMS or MMS messages, wherein the network element receives the message from the policy node and implements the SMS or MMS policy rule instruction, wherein the policy rule instruction includes at least one of: an SMS or MMS message quota or limit; an SMS or MMS message generation rate limit; and an SMS or MMS message receipt rate limit.

18. The system of claim 17 wherein the policy node comprises a policy and charging rules function (PCRF).

19. The system of claim 17 wherein the policy node is configured to generate the message for communication via a Gx interface.

20. The system of claim 17 wherein the message includes a Diameter protocol message.

21. The system of claim 17 wherein the policy node is configured to generate the message in response to receipt of a policy request.

22. The system of claim 21 wherein the network element is configured to generate the policy request.

23. The system of claim 22 wherein the network element is configured to send the request for a policy rule in response to receiving an SMS or MMS message to be routed or processed.

24. The system of claim 17 wherein communicating the message includes communicating the message via a Gx interface.

25. The system of claim 17 wherein implementing the SMS or MMS policy rule instruction comprises causing a policy rule to be at least one of: installed, modified, removed, activated, or deactivated.

26. The system of claim 25 wherein the policy rule applies to SMS or MMS messages that are associated with at least one of:
   a subscriber;
   a class of subscribers; and
   a network provider.

27. The system of claim 17 wherein the policy rule SMS or MMS quota or limit includes at least one of:
   a mobile originated (MO) SMS or MMS message quota or limit; and
   a mobile terminated (MT) SMS or MMS message quota or limit.

28. The system of claim 27 wherein the SMS or MMS message quota or limit includes at least one of:
   an SMS or MMS message count quota or limit;
   an SMS or MMS message size quota or limit; and
   an SMS or MMS message data volume quota or limit.

29. The system of claim 25 wherein the network element comprises:
   a policy and charging enforcement function (PCEF) node;
   an SMS or MMS router;
   an SMS or MMS groomer;
   an SMS or MMS service center;
   a session initiation protocol (SIP) message server;
   a multimedia message server;
   a signal transfer point;
   a first delivery attempt node; or
   an SMS or MMS gateway.

30. The system of claim 25 wherein the policy node is configured to access SMS or MMS subscriber service profile information from a subscriber data repository.

31. The system of claim 30 wherein the subscriber data repository comprises:
   a home location register;

a home subscriber server; or a subscriber profile repository.

32. The system of claim 25 wherein, based on the SMS or MMS policy rule, the network element is configured to at least one of:

relaying a received SMS or MMS message;
forwarding a received SMS or MMS message;
blocking a received SMS or MMS message;
copying a received SMS or MMS message;
redirecting a received SMS or MMS message; and
generating a new SMS or MMS message.

33. The system of claim 25 wherein the SMS or MMS policy rule is based on at least one of:

an identity of a sender of an SMS or MMS message;
an identity of a receiver of an SMS or MMS message;
an identity of a source network of an SMS or MMS message; and
an identify of a destination network of an SMS or MMS message.

34. A non-transitory computer readable medium having stored thereon executable instructions that when executed by the processor of a computer control the computer to perform steps comprising:

at a policy node, generating a message that includes a policy rule instruction pertaining to regulation of short message service (SMS) or multimedia message service (MMS) traffic;

communicating the message to an SMS or MMS routing or processing network element; and at the SMS or MMS routing or processing network element, implementing the SMS or MMS policy rule instruction, wherein the policy rule instruction includes at least one of: an SMS or MMS message quota or limit; an SMS or MMS message generation rate limit; and an SMS or MMS message receipt rate limit.

* * * * *